June 2, 1953 T. A. CONLEY 2,640,481
EXHALATION VALVE
Filed Feb. 14, 1950 2 Sheets-Sheet 1
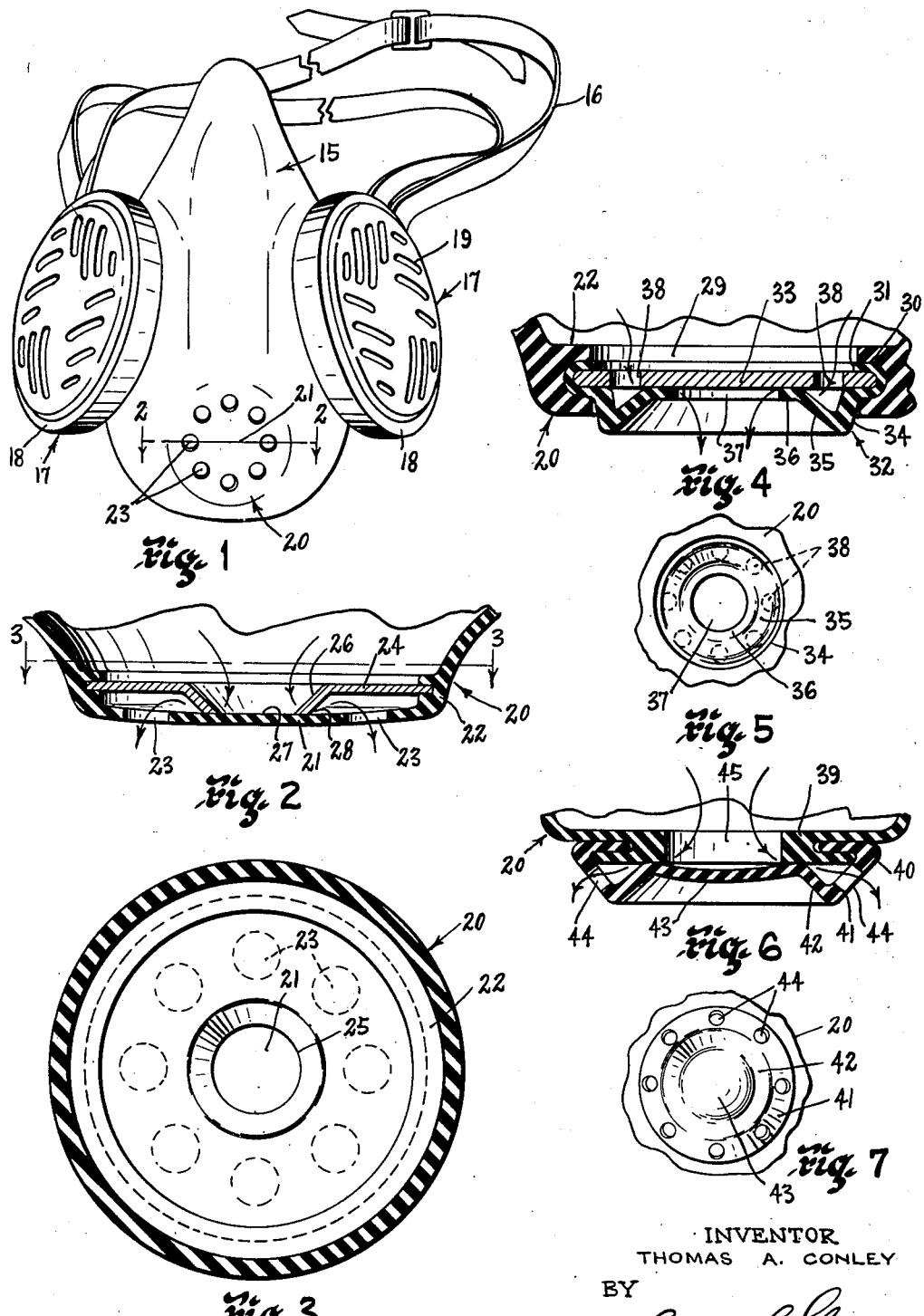
INVENTOR
THOMAS A. CONLEY
BY
Louis L. Gagnon
ATTORNEY

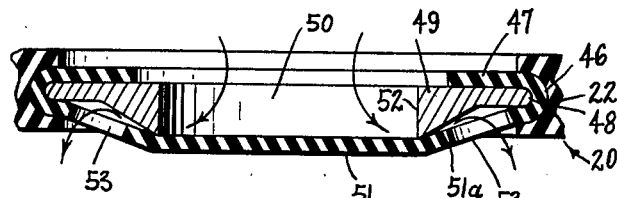
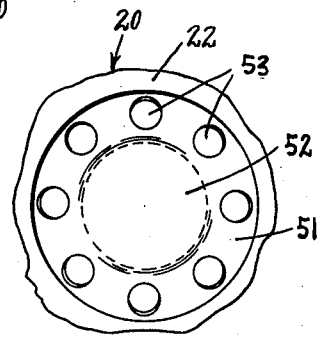
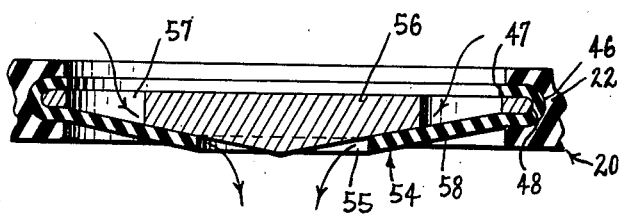
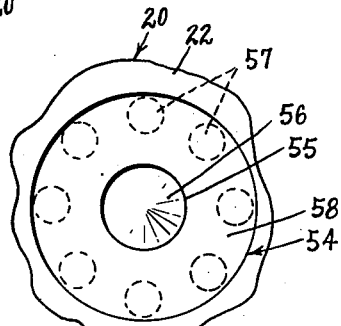
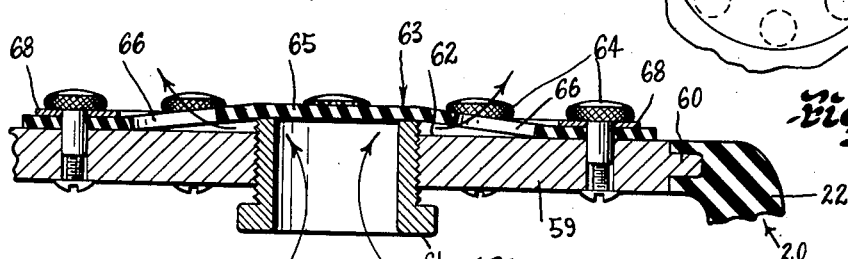
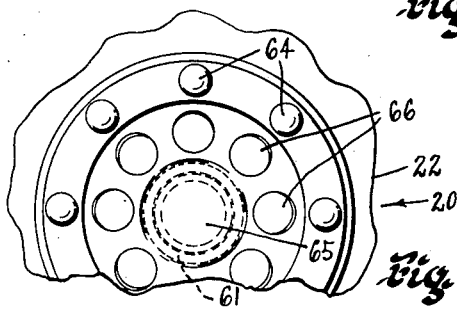

UNITED STATES PATENT OFFICE 2,640,481

EXHALATION VALVE

Thomas A. Conley, Harrisville, R. I., assignor to American Optical Company, Southbridge, Mass., a voluntary association of Massachusetts Application February 14, 1950, Serial No. 144,117

11 Claims. (Cl. 128—146)

This invention relates to improvements in valves for use in respirators or similar devices and has particular reference to the provision of an improved construction of exhalation valve and method of making the same.

One of the principal objects of the invention is to provide a valve construction adapted particularly for use as an exhalation valve in respirators or similar devices and method of making the same wherein the valve diaphragm is held under slight tension for insuring more positive sealing against leakage while affording the desired ease of exhalation and which will simultaneously function as a speaking diaphragm for ease of communication between individuals wearing such respirators.

Another object is to provide a valve construction of the above character and method of making the same wherein the general construction is exceedingly simple and inexpensive in nature while providing greater assurance against leakage particularly at the very beginning of inspiration during the breathing cycle and which will afford the desired ease of respiration.

Another object is to provide a valve of the above character embodying a resilient diaphragm supported peripherally in a supporting member and having an effective portion thereof normally lying in a given plane with respect to the supporting member, and tension means carried by said supporting member and lying rearwardly of said diaphragm embodying a portion for displacing the effective portion of the diaphragm from said plane, whereby the tendency of said effective portion of the diaphragm to return to its normal position will form a positive seal with the tension means.

Another object is to provide a valve construction of the above character wherein the sealing action against leakage during respiration is positive in nature and simple and efficient in function.

Other objects and advantages of the invention will become apparent from the following description taken in connection with the accompanying drawings, and it will be seen that many changes may be made in the details of construction, arrangement of parts and steps of the methods shown and described without departing from the spirit of the invention as expressed in the accompanying claims. I, therefore, do not wish to be limited to the exact method and details of construction shown and described as the preferred form only has been given by way of illustration.

Referring to the drawings:

Fig. 1 is a front elevational view of a device embodying the invention;

Fig. 2 is an enlarged sectional fragmentary view taken as on line 2—2 of Fig. 1 and looking in the direction indicated by the arrows;

Fig. 3 is a sectional view taken as on line 3—3 of Fig. 2 and looking in the direction indicated by the arrows;

Fig. 4 is a view generally similar to Fig. 2 of a modified form of the invention;

Fig. 5 is a reduced front elevational view of the valve construction illustrated in Fig. 4;

Fig. 6 is a view generally similar to Fig. 2 with a further modification;

Fig. 7 is a reduced front elevational view of the valve construction illustrated in Fig. 6;

Fig. 8 is a view generally similar to Fig. 2 of another modification;

Fig. 9 is a reduced front elevational view of the construction illustrated in Fig. 8;

Fig. 10 is a view generally similar to Fig. 2 of a still further modification;

Fig. 11 is a reduced front elevational view of the construction illustrated in Fig. 10;

Fig. 12 is a view generally similar to Fig. 2 with a still further modification; and Fig. 13 is an elevational view of the exterior of the valve construction illustrated in Fig. 12.

In the manufacture of respirators or similar devices, it is essential that valve means be provided for permitting exhalation of the wearer's breath without the possibility of leakage of external impure air into the respirator through the valve. In many conventional respirators, gas masks, or the like, the exhalation means are constructed with normally closed flutter-valves which are adapted to open to permit passage of air outwardly of the respirator and to act under the influence of their own inherent resiliency to revert to their initial closed conditions during inhalation. However, such valves are often inefficient due to the fact that they will not always return to the desired initial tightly closed conditions but will sometimes remain partially open and thus permit the user to inhale impure air.

The present invention is directed to overcoming these disadvantages by the provision of exhalation valves for respirators or similar devices wherein the valve diaphragms are constantly held under tension for insuring more positive sealing against leakage as well as insuring the quick return thereof to closed or sealing position, while permitting the ease of exhalation desired of such devices, and performing the dual function of acting as a speaking diaphragm for ease of communication between individuals wearing the devices.

Referring to the drawings wherein like character of reference designate like parts through the several views, the present invention is shown as embodied in a respirator of the type having a face mask 15 formed of molded rubber or similar resilient material shaped to fit over the nose and mouth of the wearer. The mask 15 has suitably attached thereto a head band 16 for securing the mask in desired position on the head of the wearer and has provided on each of the cheek portions thereof an inhalation device 17 which is suitably secured thereto in any conventional manner. A conventional inhalation device comprises a canister 18 containing suitable filtering media and air is permitted to be drawn into the interior of the canister 18 through a plurality of openings 19, the air passing through the filter where it is purified and through openings in the mask 15 communicating with the interior of the canister so that pure air only will be inhaled by the user.

The exhalation means is provided in the lower frontal portion of the face mask 15. As shown in Figs. 1 and 2, the mask is formed with an outwardly protruding valve supporting portion 20 which is preferably circular in shape and has an initially flat disc-like frontal portion or diaphragm 21 thereon. The diaphragm 21 is formed integral with the adjacent thickened side walls 22 of the supporting portion 20 but is substantially thin to provide greater resiliency throughout the area and is shaped to normally lie in a given plane with respect to the supporting member 20 whereby any pressure upon the diaphragm 21 sufficient to cause it to be moved out of the plane will be against the inherent resiliency of the material of the diaphragm. A plurality of perforations 23 are formed in the diaphragm 21 and arranged preferably in spaced circular fashion in the marginal area thereof as shown in Fig. 1 so that air from the interior of the mask can pass into the outer atmosphere.

To prevent air from passing into the interior of the mask from the outside, there is provided a substantially rigid disc-like plastic or metal tension plate or spreader 24 which has its peripheral edge interfitting closely with a circumferential groove formed interiorly of the supporting portion 20 of the mask on the inner surface of the side walls 22. It is important that the edges of the tension plate 24 be closely engaged by the material of the walls 22 so that leakage of air therearound is prevented.

The tension plate 24 is formed with a central opening 25 and the portion of the plate 24 surrounding the opening 25 is shaped to form a wall 26, the sides of which are preferably inclined inwardly and directed toward the rear surface 27 of the diaphragm 21. The length of the wall 26 is such that when the annular edge 28 thereof is in proper engagement with the rear surface 27 of the diaphragm 21, the pressure on the central effective portion of the diaphragm will cause it to be bowed slightly out of the normal plane, and due to the inherent resiliency of the material of the diaphragm 21, it will be constantly urged toward the tension plate 24 and thus maintained in engagement with the annular edge 27.

It is to be understood, however, that although the diaphragm 21 is forced outwardly sufficiently to provide the desired tension and result in a slightly bulging appearance, the tension will not be great enough to prevent pressure formed by the normal exhalation of the wearer's breath from causing the effective portion of the diaphragm to be displaced still further outwardly, out of engagement with the edge 28 of the wall 26, whereupon the exhaled air will be permitted to leave the interior of the mask 15, following the path indicated by the arrows in Fig. 2. In this way, the exhaled air will pass outwardly through the opening in the tension plate 24 around the annular edge 28, and out through the openings 23 in the diaphragm 21. Then after the exhaled air has left the mask, the pressure upon the diaphragm 21 will be relieved whereupon the inherent resiliency of the material will cause the diaphragm to quickly and efficiently re-engage the annular edge 28 of the tension plate 24, and the wearer can safely inhale purified air through the filters in the inhalation devices 17 in the usual manner without danger of leakage through the exhalation valve.

The particular construction described also provides much greater ease in communication between persons wearing masks having exhalation valves of this type since only the thin diaphragms 21 are located between the wearers' mouths and the outer atmosphere thereby permitting the voices to be heard more distinctly than is generally possible otherwise.

It is particularly pointed out that other constructions may be used wherein the diaphragm of the valve is constantly maintained under tension in accordance with this invention, such as shown in Figs. 4 and 5. In this arrangement the mask 15 is provided with the outwardly protruding supporting portion 20 which has the thickened side walls 22 as shown. The supporting portion 20 is provided with an enlarged circular opening 29 having a circumferential groove 30 therein. The peripheral edge portion 31 of a resilient diaphragm 32 is located in close interfitting relation with the groove 30 and is also formed with an inner circumferential groove in which is positioned the peripheral edge of a comparatively rigid disc-like spreader plate 33.

The resilient diaphragm 32 is preferably formed of molded rubber or other material similar to the material from which the face mask 15 is formed and has an outer annular portion 34 shaped to extend outwardly of the mask and an inner annular portion 35 formed integral with the outer annular portion 34 and extending inwardly, the remaining portion thereof forming a central disc-like effective portion 36 normally lying in a given plane with respect to the supporting member 20. The spreader plate 33 is so located, however, that its frontal surface will be engaged by the rear surface of the diaphragm central effective portion 36 and maintain the portion 36 constantly in displaced relation with respect to the normal plane thereof, this displacement being against the inherent resiliency of the diaphragm. With this particular construction, the inherent resiliency in the annular portions 34 and 35 will exert a constant tension upon the effective portion 36 whereby the diaphragm 36 will yieldingly engage the spreader plate 33.

The spreader plate 33 closely interfits with the groove of the peripheral edge portions 31 of the resilient member 32 to prevent leakage of air therebetween and is provided with a plurality of openings 38 arranged in spaced circular fashion (Fig. 5) for permitting exhaled air to pass from the interior of the mask into the space between the annular portions 34 and 35, as indicated by the arrows in Fig. 4. The effective portion 36 of the diaphragm will, under the pressure of the exhaled air, be displaced still further outwardly of the normal plane and out of engagement with the spreader plate 33 whereupon the exhaled air will be permitted to pass therebetween and through the opening 37 in the diaphragm 36 to the outer atmosphere. After the pressure is relieved, the diaphragm 36 will, due to the inherent resiliency of the annular portions 34 and 35, return to its initial closed engagement with the spreader plate 33.

Figs. 6 and 7 show a further modification wherein the supporting portion 20 is provided with a substantially thick frontal portion 39, which frontal portion 39 is arranged to have an exterior circumferential groove therein in which is adapted to be located the peripheral edge of a resilient diaphragm 40. The diaphragm 40 is provided with an outer annular portion 41 which is shaped to incline inwardly and forwardly of the mask and has a rearwardly inclined inner annular portion 42 formed integral therewith, the inner annular portion 42 being directed rearwardly to a point where it will engage the anterior surface of the frontal portion 39 of the mask. An effective portion 43 of the diaphragm has its peripheral edge formed integral with the inner edge of the inner annular portion 42 and is preferably initially formed with sufficient tension in the form of a slight outward cupping as shown in Fig. 6. With this construction, the frontal portion 39 of the mask is comparatively rigid due to its increased size and shape and its anterior surface extends forwardly of the plane defined by the periphery of the diaphragm supported thereby, thus causing the effective portion 43 of the diaphragm to be displaced forwardly out of its normal plane and against its inherent resiliency. The frontal portion 39 of the mask thus acts in a manner similar to the separate tension plates shown in Figs. 2 and 4. The outer annular portion 41 is provided with a plurality of spaced openings 44 therein and the frontal portion 39 is provided with an enlarged central opening 45. Thus exhaled air will be permitted to pass through the opening 45 and when sufficient pressure is exerted upon the diaphragm to overcome the inherent resiliency thereof and of the annular portions 42 and 41 to cause the effective portion 43 of the diaphragm to be spaced from the frontal portion 39, the air will be permitted to pass therebetween and outwardly into the outer atmosphere through the openings 44. After exhalation, the inherent resiliency of the diaphragm will cause the effective portion 43 thereof to return to sealing engagement with the frontal portion 39.

A further modification is shown in Figs. 8 and 9 wherein the thickened side walls 22 of the supporting portion 20 of the mask are each provided with an interior circumferential groove 46 which is adapted to receive the peripheral edge of a resilient diaphragm 47, the diaphragm 47 being provided with an inner circumferential groove 48 in which is located the peripheral edge of a substantially rigid tension plate 49. The tension plate 49 and peripheral edge portion 47, as well as the edge portion 47 and side walls 22, are closely interfitted so that there will be no leakage of air between the parts. The tension plate 49 is provided with an enlarged central opening 50 and the portion 52 thereof encircling the opening is substantially thicker than the peripheral edge portions and is adapted to engage the rear surface of the effective porton 51 of the diaphragm 47 and cause it to be displaced outwardly out of its normal plane. The diaphragm portion 51 overlies the opening 50 in the plate 49 and seals the opening 50. In this construction, since the thickened internal portion 52 of the tension plate 49 bears against the inner surface of the diaphragm portion 51 to urge the diaphragm outwardly as shown in Fig. 8, the inherent resiliency in the diaphragm 51 will constantly urge it to return to its normal plane and will thus maintain it in yielding engagement with the portion 52 adjacent the opening 50 in the tension plate 49. The annular portion 51a surrounding the effective portion 51 of the diaphragm 47 is provided with a plurality of openings 53 therein. Exhaled air will be directed, as indicated by the arrows in Fig. 8, into the opening 50 and will cause the diaphragm portion 51 to be disengaged from the tension plate 49, whereupon it will pass into the space between the annular portion 51a of the diaphragm member 47 and thickened portion 52 of the tension plate 49, and thence outwardly through the openings 53.

A still further modification is shown in Figs. 10 and 11 wherein a resilient diaphragm 54 is supported similar to the diaphragm 47 in Fig. 8 and is provided with a single enlarged central opening 55 therein. A tension plate 56 is provided and is supported similar to the tension plate 49 in Fig. 8 and is provided with a plurality of openings 57 therein arranged in circular fashion adjacent the outer edge thereof. The anterior surface of the tension plate 56 is slightly conical in shape and engages the diaphragm, causing the diaphragm to be displaced from its normal plane, whereby the effective portion 58 of the diaphragm 54 will, due to its inherent resiliency, be normally maintained under tension in engagement with the conical anterior surface of the tension plate 56. Upon pressure exerted by exhaled breath of the wearer, the effective portion 58 of the diaphragm will be forced to move out of engagement with the tension plate 56, permitting the air to pass outwardly of the mask through the openings 47 and 55.

Figs. 12 and 13 illustrate a still further modification and comprise a disc-like rigid plate 59 of substantial thickness which has a reduced peripheral edge 60 embedded in the side walls 22 of the supporting portion 20. The plate 59 is provided with a central opening therein in which is threadedly located a short tubular adjusting member 61. The tubular member 61 is threaded into the plate 59 to such an extent that the outer end thereof will protrude a controlled distance beyond the anterior surface 62 of the plate 59. A disc-like diaphragm 63 of rubber or similar resilient material is placed in overlying relation with the surface 62 and end of the tubular member 61 and is tightly secured around its periphery to the plate 59 by suitable means such as screws 64, studs, rivets, pins, adhesive or other suitable means which extend through an annular retaining member 68. The tubular member 61, by extending beyond the surface of the plate 59 caused the central or effective portion 65 of the diaphragm to be displaced outwardly out of its normal plane and because of the inherent resiliency thereof the central or effective portion 65 of the diaphragm will tend to remain in constant engagement with the end of the tubular member 61, sealing it from the passage of air. The tubular member 61 can be adjusted inwardly and outwardly of the threaded opening in the plate 59. In this way the desired amount of tension can be introduced of the diaphragm to control the pressure of air needed to cause the diaphragm to be moved out of engagement with the end of the tubular member, whereupon the air will be permitted to pass through the tubular member, around the end thereof, and outwardly through a plurality of openings 66 formed in the resilient member 63 intermediate the diaphragm 65 and the peripheral portion which is secured to the plate 59.

The latter construction is adapted for use with devices other than gas masks and respirators and is particularly useful as an escape valve for steam formed during use of covered cooking utensils and the like.

From the foregoing it will be seen that improved means of simple, efficient and economical nature have been provided for accomplishing all of the objects of the invention, particularly by embodying means for constantly maintaining tension on exhalation valve diaphragms and thus permitting more efficient functioning of exhalation valves of the type described.

While the novel features of the invention have been shown and described and are pointed out in the annexed claims, it will be understood that many changes may be made in the details of construction shown and described without departing from the spirit of the invention. I, therefore, do not wish to be limited to the exact details shown and described as the preferred forms only are set forth by way of illustration.

I claim:

1. A valve of the character described comprising an enclosure member having an annular-like valve supporting wall provided with a circumferentially extending channel in the inner surface thereof, a disc-like resilient diaphragm overlying the open area defined by said annular-like wall and connected throughout its periphery to said wall, and a substantially rigid disc-like tension plate having its periphery seated in said channel, said tension plate being spaced from said diaphragm and having a protruding annular portion directed toward said diaphragm and in engagement therewith whereby the diaphragm will be yieldably held by the inherent resiliency of the material thereof in engagement with the tension plate, said diaphragm and tension plate having openings therein for permitting passage of air therethrough when air pressure is sufficient to overcome the inherent resiliency of the material of the diaphragm and cause it to be moved out of engagement with said annular portion.

2. A valve of the character described comprising a supporting member having an entrance opening provided with a channel in the wall thereof, and a substantially rigid disc-like tension plate having its periphery seated in said channel and a disk-like resilient diaphragm overlying said tension plate and with its margin intimately connected with the peripheral edge of the tension plate to prevent seepage of air, said tension plate being spaced from said diaphragm and having a central opening surrounded by a protruding annular portion directed toward said diaphragm and in engagement therewith whereby the diaphragm will be constantly yieldably held by the inherent resiliency of the material thereof in engagement with the end of said annular portion, said diaphragm having openings therein communicating with the space between the diaphragm and the spaced tension plate whereby when air pressure is sufficient to overcome the inherent resiliency of the material of the diaphragm and cause it to be moved out of engagement with said annular portion the air will be permitted to escape through the openings in the tension plate and diaphragm.

3. A valve of the character described comprising an annular supporting member, a circular resilient member within said supporting member and connected throughout its periphery to the supporting member, and a substantially rigid disc-like tension plate secured throughout its periphery to said supporting member, said resilient member having an outer annular portion extending in a direction away from said tension plate, an inner annular portion integral with the outer peripheral edge of said outer annular portion and directed toward said tension plate, the inner peripheral edge of said inner annular portion engaging said tension plate and diaphragm connected throughout its periphery to the inner peripheral edge of said inner annular portion and engaging said tension plate, said annular portions being of controlled resiliency whereby the diaphragm will be constantly yieldably urged by the inherent resiliency of the material thereof into engagement with the tension plate, said diaphragm and tension plate having openings therein whereby when air pressure is sufficient to overcome the inherent resiliency of the material of the annular portions causing the diaphragm to be moved out of engagement with the tension plate the air will be permitted to escape through said openings.

4. A valve of the character described comprising an annular supporting member, a disc-like resilient diaphragm within said supporting member and connected throughout its periphery to said supporting member, and a substantially rigid tension plate connected throughout its periphery to said supporting member and positioned in superimposed relation with said resilient member, said tension plate having a conically shaped surface engaging the resilient member and constantly yieldingly urging the resilient member against the inherent resiliency of the material thereof in a direction away from the tension plate, said resilient member having a central opening therein, and said tension plate having openings therein sealed by said resilient member, whereby when air pressure on said resilient member is sufficient to cause it to move out of engagement with the surface of the tension plate, air will be permitted to escape through the openings in the tension plate, between the tension plate and resilient member and through the central opening in the resilient member.

5. A device of the character described comprising an enclosure member having an aperture provided with an encircling channel in the wall thereof, and valve means mounted in said aperture including a substantially rigid plate-like member having its periphery seated in said channel, and a resilient diaphragm connected throughout its periphery to said rigid member in sealed relation to prevent seepage of air therebetween, said rigid member having a central opening therein and a tubular member positioned within said opening and having one end engaging said diaphragm for causing the diaphragm to be flexed outwardly against the inherent resiliency of the material thereof whereby the diaphragm will be constantly yieldably urged into engagement with the end of the tubular member, said tubular member being adjustable toward and away from said diaphragm to provide the desired tension in said diaphragm, said diaphragm having openings in the portion thereof between the area covering the tubular member and the marginal area secured to the rigid member, whereby when air pressure is sufficient to overcome the inherent resiliency of the material of the diaphragm to cause it to move out of engagement with the end of the tubular member air will be permitted to escape through the tubular member, around the end thereof and through the openings of the diaphragm.

6. A device of the character described comprising a face mask formed of flexible material and having an apertured portion with a channel formed in the peripheral wall of said apertured portion and a pair of superimposed members enclosing said aperture and with their peripheral portions fitted within said channel of the resilient face mask, the inwardly disposed members being formed of relatively rigid material and the outer member of flexible material, said members each being provided with at least one opening, and with said openings being offset with respect to each other whereby when the device is in position of use the resilient member may be displaced on exhalation to permit air to be passed out through said openings but on inhalation will prevent air from entering the interior of the face mask.

7. A device of the character described comprising a face mask formed of flexible material and having an apertured portion with a channel formed in the peripheral wall of said apertured portion, a relatively rigid member shaped to fit within said aperture and with its peripheral portion seated within said channel, and an outer member of flexible material superimposed over said rigid member with its peripheral margin wrapped about the peripheral portion of the rigid member seated in said channel, said members each being provided with at least one opening, and with said openings being offset with respect to each other whereby when the device is in position of use the resilient member may be displaced on exhalation to permit air to be passed out through said openings but on inhalation will prevent air from entering the interior of the face mask.

8. A device of the character described comprising a face mask formed of flexible material and having an apertured portion with a channel formed in the peripheral wall of said apertured portion and a pair of superimposed members enclosing said aperture and with their peripheral portions fitting within said channel of the resilient face mask, the inwardly disposed members being formed of relatively rigid material and the outer member of flexible material, said rigid members having a central opening surrounded by an outwardly extending wall engaging the central portion of the resilient member, and with said resilient member having openings offset with respect to said central opening of the rigid member whereby when the device is in use the resilient member may be displaced on exhalation to permit air to be passed out through said openings but on inhalation will prevent air from entering the interior of the face mask.

9. A device of the character described comprising a face mask formed of flexible material and having a filtered entrance for permitting air to enter the interior of the mask on inhalation and a further opening for allowing air to leave said interior and valve means overlying said opening and intimately connected with the surrounding wall of the face mask, said valve means embodying a relatively flexible member and a relatively rigid member arranged in superimposed relation with the peripheral portion of one extending about the periphery of the other to prevent seepage of air therebetween, and with the rigid member constituting the inwardly disposed one of the two superimposed members of the valve, said members each being provided with at least one opening, and with said openings being offset with respect to each other whereby when the device is in position of use the resilient member may be displaced on exhalation to permit air to be passed out through said opening but on inhalation will prevent air from entering the interior of the face mask through said valve.

10. A device of the character described comprising a face mask formed of flexible material and having a filtered entrance for permitting air to enter the interior of the mask on inhalation and having an exhalation valve for allowing air to leave said interior, said valve, embodying a relatively flexible member and a relatively rigid member arranged in superimposed relation with their peripheral parts in sealed relation to prevent seepage of air therebetween, said face mask having an annular-like channeled portion formed in a sidewall thereof and with the peripheral edges of one of said members being seated in said channel and with the rigid member constituting the inwardly disposed one of the two superimposed members of the valve, said members each being provided with at least one opening, and with said openings being offset with respect to each other whereby when the device is in position of use the resilient member may be displaced on exhalation to permit air to be passed out through said opening but on inhalation will prevent air from entering the interior of the face mask through said valve.

11. A device of the character described comprising an enclosure member having an aperture provided with an encircling channel in the wall thereof, and valve means mounted in said aperture, said valve, embodying a relatively flexible member and a relatively rigid member arranged in superimposed relation with their peripheral parts in sealed relation to prevent seepage of air therebetween, and with the peripheral edges of one of said members being seated in said channel, the rigid member constituting the inwardly disposed one of the two superimposed members of the valve, and said members each being provided with at least one opening, said openings being offset with respect to each other whereby when the device is in use the resilient member may be displaced to permit air to be passed out through said opening but will prevent air from entering the interior of the enclosure member through said valve means.

THOMAS A. CONLEY.

References Cited in the file of this patent

UNITED STATES PATENTS

| Number | Name | Date |
|---|---|---|
| 1,755,993 | Kelley | Apr. 22, 1930 |
| 2,160,317 | Schwartz | May 30, 1939 |
| 2,174,503 | Whipple | Sept. 26, 1939 |

FOREIGN PATENTS

| Number | Country | Date |
|---|---|---|
| 439,278 | Great Britain | of 1935 |